(12) United States Patent
Dombrowski et al.

(10) Patent No.: US 10,119,040 B2
(45) Date of Patent: Nov. 6, 2018

(54) PAINT COMPOSITION

(71) Applicant: Rohm and Haas Company, Collegeville, PA (US)

(72) Inventors: Gary W. Dombrowski, Chester Springs, PA (US); Pu Luo, King of Prussia, PA (US); Partha S. Majumdar, Harleysville, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/659,813

(22) Filed: Jul. 26, 2017

(65) Prior Publication Data

US 2018/0037753 A1 Feb. 8, 2018

Related U.S. Application Data

(60) Provisional application No. 62/372,056, filed on Aug. 8, 2016.

(51) Int. Cl.
| | |
|---|---|
| *C08F 2/00* | (2006.01) |
| *C08F 210/00* | (2006.01) |
| *C09D 7/61* | (2018.01) |
| *C09D 7/63* | (2018.01) |
| *C09D 5/00* | (2006.01) |
| *C09D 133/26* | (2006.01) |
| *C08F 2/30* | (2006.01) |
| *C09D 5/02* | (2006.01) |
| *C08F 265/06* | (2006.01) |
| *C09D 151/00* | (2006.01) |
| *C08K 3/22* | (2006.01) |
| *C08K 3/28* | (2006.01) |
| *C08K 5/25* | (2006.01) |
| *C08F 220/18* | (2006.01) |

(52) U.S. Cl.
CPC ............. *C09D 7/61* (2018.01); *C08F 2/30* (2013.01); *C08F 265/06* (2013.01); *C09D 5/00* (2013.01); *C09D 5/024* (2013.01); *C09D 7/63* (2018.01); *C09D 133/26* (2013.01); *C09D 151/003* (2013.01); *C08F 2220/1841* (2013.01); *C08K 3/22* (2013.01); *C08K 3/28* (2013.01); *C08K 5/25* (2013.01); *C08K 2003/2296* (2013.01)

(58) Field of Classification Search
CPC ... C09D 7/62; C09D 7/63; C09D 5/00; C09D 133/26; C09D 5/024; C09D 151/003; C08F 2/30; C08F 265/06; C08F 2220/1841; C08K 5/25; C08K 3/28; C08K 3/22; C08K 2003/2296
USPC .............................. 524/192; 526/317.1, 319
See application file for complete search history.

(56) References Cited

U.S. PATENT DOCUMENTS

| | | | |
|---|---|---|---|
| 4,267,091 A | 5/1981 | Geelhaar et al. | |
| 4,980,411 A | 12/1990 | Beckerle et al. | |
| 5,859,112 A * | 1/1999 | Overbeek | C08F 265/04 523/201 |
| 6,727,314 B2 | 4/2004 | Burghart et al. | |
| 7,459,496 B2 | 12/2008 | Hsu et al. | |
| 8,519,043 B2 | 8/2013 | Hartig et al. | |
| 2013/0079456 A1 | 3/2013 | Yang et al. | |
| 2016/0186000 A1 | 6/2016 | Yang et al. | |
| 2017/0275408 A1 | 9/2017 | Yang et al. | |

FOREIGN PATENT DOCUMENTS

| | | |
|---|---|---|
| CN | 102585072 A | 7/2012 |
| CN | 103709316 A | 4/2014 |
| CN | 104073112 A | 10/2014 |
| JP | 63284280 | 11/1988 |
| JP | 2007297492 A | 11/2007 |
| WO | 2011080067 A2 | 7/2011 |

* cited by examiner

*Primary Examiner* — William K Cheung
(74) *Attorney, Agent, or Firm* — Reid S. Willis

(57) ABSTRACT

The present invention relates to a deep base or accent coating composition comprising an acrylic based binder and a $Zn^{++}$ additive. The composition of the present invention resists water staining better than comparable formulations that do not contain the additive.

10 Claims, No Drawings

PAINT COMPOSITION

BACKGROUND OF THE INVENTION

The present invention relates to a paint composition that shows an improvement in water stain resistance.

Accent and deep base high gloss and semigloss paints contain substantial levels of colorants. When the highly colored paint is applied to a substrate and allowed to dry, exposure to water droplets over time can cause severe water staining, which is attributed to leaching of water-soluble materials from the paint film. Water staining is even more likely to occur shortly after the paint is applied to the substrate: The film may be poorly formed due to incomplete chain entanglement, thereby allowing penetration of water with concomitant leaching of the water-soluble materials. Over time, completion of latex particle deformation and polymer chain diffusion improves film integrity, which can improve resistance towards water staining. Accordingly, it continues to be a challenge to develop a highly colored paint formulation that resists water staining.

SUMMARY OF THE INVENTION

The present invention addresses a need in the art by providing a paint composition comprising a stable aqueous dispersion of acrylic based polymer particles functionalized with from 0.2 to 12 weight percent, based on the weight of the polymer particles, of structural units of a monomer with keto functionality; a colorant at a concentration in the range of from 5 to 25 weight percent, based on the weight of the paint composition; from 0.5 to 5 weight percent of a $Zn^{++}$ compound, based on the weight of the paint composition; and from 0.5 to 10 weight percent of a dihydrazide or a polyamine, based on the weight of the paint composition; and a substantial absence of extenders;
wherein the polymer particles are two-phase polymer particles with a soft phase having a $T_g$ of not more than 0° C., and a hard phase having a $T_g$ of not less than 30° C.; wherein the ratio of the soft phase to the hard phase is in the range of from 90:10 to 60:40; with the proviso that the polymer particles have an overall $T_g$ of less than 15° C.

The composition of the present invention addresses a need in the art by providing a deep base or accent paint formulation that resists water staining.

DETAILED DESCRIPTION OF THE INVENTION

The present invention addresses a need in the art by providing a paint composition comprising a stable aqueous dispersion of acrylic based polymer particles functionalized with from 0.2 to 12 weight percent, based on the weight of the polymer particles, of structural units of a monomer with keto functionality; a colorant at a concentration in the range of from 5 to 25 weight percent, based on the weight of the paint composition; from 0.5 to 5 weight percent of a $Zn^{++}$ compound, based on the weight of the paint composition; and from 0.5 to 10 weight percent of a dihydrazide or a polyamine, based on the weight of the paint composition; and a substantial absence of extenders;
wherein the polymer particles are two-phase polymer particles with a soft phase having a $T_g$ of not more than 0° C., and a hard phase having a $T_g$ of not less than 30° C.; wherein the ratio of the soft phase to the hard phase is in the range of from 90:10 to 60:40; with the proviso that the polymer particles have an overall $T_g$ of less than 15° C.

As used herein, the term "acrylic based polymer particles" refers to polymer particles that comprise at least 30% by weight of structural units of an acrylic monomer. The term "acrylic monomer" refers to one or more acrylate and/or methacrylate monomers, examples of which include methyl methacrylate ($T_g$=105° C.), ethyl methacrylate ($T_g$=65° C.), butyl methacrylate ($T_g$=20° C.), ureido methacrylate ($T_g$=100° C.), ethyl acrylate ($T_g$=−22° C.), butyl acrylate ($T_g$=−54° C.), 2-ethylhexyl acrylate ($T_g$=−85° C.), and 2-propylheptyl acrylate ($T_g$=−68° C.). Preferred combinations of acrylic monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and 2-ethylhexyl acrylate being most preferred.

The term "structural unit" of the named monomer refers to the remnant of the monomer after polymerization. For example, a structural unit of methyl methacrylate is as illustrated:

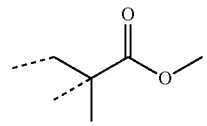

where the dotted lines represent the points of attachment of the structural unit to the polymer backbone.

The acrylic based polymer particles further comprise preferably from 0.5, more preferably from 1, and most preferably from 2 weight percent, to preferably 10 weight percent structural units of a monomer with keto functionality, that is, a monomer containing a ketone or aldehyde group, based on the weight of the polymer particles. Preferred monomers with keto functionality are acetoacetoxyethyl methacrylate (AAEM, $T_g$=3° C.), preferably at a concentration in the range of from 4 to 10 weight percent, based on the weight of the polymer particles, or diacetone acrylamide (DAAM, ($T_g$=85° C.)), preferably at a concentration in the range of from 1 to 5 weight percent, based on the weight of the polymer particles.

The acrylic based polymer particles may also include up to 70 weight percent structural units of other non-acrylic monomers such as styrene ($T_g$=100° C.). Additionally, the polymer particles preferably comprises from 0.2, more preferably from 0.5, and most preferably from 1 weight percent, to preferably 5, and more preferably to 3 weight percent structural units of a carboxylic acid monomer such as acrylic acid ($T_g$=103° C.), methacrylic acid ($T_g$=185° C.), or itaconic acid ($T_g$=154° C.).

$T_g$ refers to the glass transition temperature as calculated by the Fox equation. (See T. G. Fox, *Bull. Am. Phys. Soc.* 1, 123 (1956).) The polymer particles are 2-phase polymer particles preferably having an overall $T_g$ of less than 5° C. The polymer particles have a first phase $T_g$ of preferably less than 10° C., more preferably less than 0° C., and most preferably less than −10° C.; and a second phase $T_g$ of preferably greater than 40° C., more preferably greater than 60° C., and most preferably greater than 80° C.

In one preferred embodiment, the first phase comprises from 45, more preferably from 48, most preferably from 50, to preferably 70, more preferably to 65, and most preferably to 60 weight percent structural units of 2-ethylhexyl acrylate, based on the weight of the first phase of the polymer particles; and preferably from 20, more preferably from 30, and most preferably from 35, to preferably 50, more preferably to 45 weight percent structural units of methyl methacrylate or styrene, preferably methyl methacrylate based on the weight of the first phase of the polymer particles.

In another preferred embodiment, the first phase comprises from 1, more preferably from 7, and most preferably from 10, to 80, more preferably to 60 and most preferably to 40 weight percent butyl acrylate, based on the weight of the first phase of the polymer particles; and from 0, more preferably from 15, more preferably from 25, and most preferably from 40, to 70, more preferably to 65, and most preferably to 60 weight percent 2-ethylhexyl acrylate based on the weight of the first phase of the polymer particles; and from 10, more preferably from 20, more preferably from 30, and most preferably from 35, to preferably 50, more preferably to 45 weight percent structural units of methyl methacrylate or styrene, preferably methyl methacrylate based on the weight of the first phase of the polymer particles.

The first phase further comprises preferably from 4 to 10 weight percent structural units of AAEM or from 1 to 5 weight percent structural units of DAAM, based on the weight of the first stage of the polymer particles, and preferably from 0.5 to 5 weight percent structural units of acrylic acid or methacrylic acid.

The second phase of the polymer particles preferably comprises from 80, more preferably from 85, and most preferably from 90 weight percent, to 98.5, more preferably to 98, and most preferably to 97 weight percent structural units of methyl methacrylate or styrene, preferably methyl methacrylate. The second phase further comprises preferably from 4 to 10 weight percent structural units of AAEM or from 1 to 5 percent structural units of DAAM, based on the weight of the second phase of the polymer particles and preferably from 0.5 to 5 weight percent structural units of acrylic acid or methacrylic acid.

The ratio of the first phase to second phase is preferably in the range of from 85:15, more preferably from 80:20, and most preferably from 75:25, to preferably 65:35.

The composition of the present invention comprises colorant at a concentration in the range of from 5, preferably from 8, more preferably from 10, to 25, more preferably to 20, based on the weight of the composition. The colorant is a non-white colorant and may be organic or inorganic. Examples of organic colorants include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds. Inorganic colorants include carbon black, lampblack, black iron oxide, yellow iron oxide, brown iron oxide, red iron oxide.

The composition further comprises from 0.2, preferably from 0.5, to 5, preferably to 4, and most preferably to 3 weight percent of a $Zn^{++}$ compound, based on the weight of the composition. Examples of suitable $Zn^{++}$ compounds include ZnO, $Zn(NH_3)_2(CO_3)_2$, $ZnCl_2$, and $Zn(OAc)_2$.

The composition further comprises from 0.1, and preferably from 0.2 to 10, more preferably to 5 weight percent of a dihydrazide or a polyamine, based on the weight of the composition. Examples of polyamines include diamines such as 3,3'-(ethane-1,2-diylbis(oxy))bis(propan-1-amine); 4,9-dioxadodecane-1,12-diamine; 4,9-dioxadodecane-1,12-diamine; 4,7-dioxadodecane-1,10-diamine; and 4,7,10-trioxatridecane-1,13-diamine. Commercial examples of polyamines are polyetheramines such as JEFFAMINE D-230, JEFFAMINE D-400, JEFFAMINE D-2000, JEFFAMINE M-600, JEFFAMINE M-1000, JEFFAMINE ED-600, JEFFAMINE ED-900, T-403, and JEFFAMINE T-3000 polyetheramines.

Examples of dihydrazides include adipic acid dihydrazide (ADH), carbodihydrazide (CDH), sebacic acid dihydrazide (SDH), valine dihydrazide (VDH), isophthalic dihydrazide (ISODH), and eicosanedioic hydrazide ICODH). Preferably, the dihydrazide is ADH.

The composition further comprises a substantial absence of extenders. As used herein, a substantial absence of extenders in the composition refers to less than 10, preferably less than 5, more preferably less than 1, and most preferably 0 PVC of any white, translucent, or semi-transparent inorganic particulate filler, with the exception of zinc-containing compounds, that does not impart a significant (non-white) color or hue. Thus, the composition comprises a substantial absence of $TiO_2$; $BaSO_4$; silicates and aluminosilicates such as talc, clay, mica, and sericite; $CaCO_3$; nepheline; feldspar; wollastonite; kaolinite; dicalcium phosphate; and diatomaceous earth.

The composition of the present invention advantageously includes a variety of other additives such as rheology modifiers, defoamers, neutralizing agents, surfactants, and dispersants. It has surprisingly been discovered that the composition of the present invention shows superior water-stain resistance as compared to deep base formulations that do not contain a $Zn^{++}$ additive.

EXAMPLES

Example 1—Preparation of Deep Base Binder with ZnO

Monomer emulsion 1 (ME1) was prepared by mixing DI water (409.69 g), Disponil FES-32 surfactant (55.95 g), followed by diacetone acrylamide (36.29 g), 2-ethylhexyl acrylate (666.59 g), methyl methacrylate (482.7 g), and methacrylic acid (24.2 g). Monomer emulsion 2 (ME2) was prepared by mixing DI water (142.83 g), Disponil FES-32 surfactant (24.71 g), diacetone acrylamide (14.82 g), methyl methacrylate (469.43 g), and methacrylic acid (9.88 g).

A 1-g reactor equipped with a mechanical stirrer, thermometer, condenser, heating mantel, and temperature controller was charged with deionized water (944.5 g) and heated to 85° C. while purged with $N_2$. To this reactor were added Disponil FES-32 surfactant (14.2 g) in water (20 g), a solution of sodium carbonate (3.42 g) in water (60 g), ME1 (59.6 g) in water (22.5 g), and a solution of ammonium persulfate (4.55 g) in water (40 g).

Five minutes later, a co-feed catalyst solution of ammonium persulfate (1.6 g) in water (119.28 g) was fed in the reactor at a rate of 0.91 g/min, followed by the addition of ME1 at the rate of 10.4 g/min, at a controlled reaction temperature of 85° C. Twenty minutes later, the ME1 feed rate was increased to 20.8 g/min. After completion of addition of ME1, the monomer emulsion vessel was rinsed with DI water (50 g), the co-feed catalyst solution was stopped, and the reaction temperature was controlled at 85° C.

Thirty minutes later, the co-feed catalyst solution feed was resumed at a rate of 0.91 g/min, followed the addition of ME2 at the rate of 22.5 g/min, at a controlled reaction temperature of 85° C. After completion of addition of ME2, the monomer emulsion vessel was rinsed with DI water (32 g), and the reactor cooled to 60° C. A solution of ferrous sulfate heptahydrate (20 g, 0.15% aqueous solution) was then added to the reactor, followed by a solution of t-butyl hydroperoxide (2.24 g) in water (34.62 g), and a solution of Bruggolite FF6M reducing agent (1.07 g) in water (35.78 g), both at the rate of 1.2 g/min. After completion of all feeds, the reactor was cooled to room temperature. When the reactor reached 50° C., ammonium hydroxide was added (10 g, 28% aq.), followed by addition of a slurry of adipic acid dihydrazide (26.07 g) in water (70 g). At 40° C., a solution of KATHON™ LX bactericide (A Trademark the The Dow Chemical Company or its Affiliates, 2.56 g, 1.5%) in water (20 g) was added. When the reactor temperature cooled completely, its contents were filtered to remove gel. The filtered dispersion was found to have a solids content of 45.9% and a pH of 8. An aqueous ZnO slurry (2.5% ZnO, based on the weight of polymer solids) was blended with the dispersion using an overhead stirrer.

The $T_g$ of the copolymer derived from the ME1 monomers was calculated to be −30° C. and the $T_g$ of the copolymer derived from ME2 monomers was calculated to be 106° C. The overall $T_g$ of the polymer particles was 1.1° C.

Example 2—Preparation of Deep Base Binder with Zinplex 15 Zn Complex

The composition was prepared as described in Example 1 except that Zinplex 15 Zn complex (1.5 weight percent $Zn(NH_3)_2(CO_3)_2$, based on the weight of the polymer solids) was used as the $Zn^{++}$ additive.

Comparative Example 1—Preparation of Deep Base Binder without $Zn^{++}$

The composition was prepared as described in Example 1 except that no $Zn^{++}$ compound was added to the formulation.

Paint Preparation

The paint composition without $Zn^{++}$ compound is described in Table 1.

TABLE 1

Paint Composition

| Material Name | Amount (g) |
| --- | --- |
| LetDown | |
| Water | 10.13 |
| TAMOL ™ 2011 Dispersant | 1.13 |
| Foamstar A-34 Defoamer | 0.25 |
| TERGITOL 15-S-20 Surfactant | 1.00 |
| Ammonia (28% aq) | 0.10 |
| Adjust pH to ~8.6 | |
| Comparative Example 1 binder | 159.92 |
| Velate 368 Coalescent | 3.67 |
| ACRYSOL RM-3000 Rheology Modifier | 6.06 |
| ACRYSOL RM-995 Rheology Modifier | 1.63 |
| Water | 33.81 |

(TAMOL, TERGITOL, and ACRYSOL are all Trademarks of The Dow Chemical Company or its Affiliates)

The paint was prepared as follows: In a 0.25-L plastic container, defoamer, surfactant, dispersant, ammonia, and water were added and mixed under an overhead stirrer. Next, binder and coalescent were added and mixed for 2-3 min. Stirring speed was increased and RM-3000 was added slowly. An increase in viscosity was observed during this addition. Next, RM-995 and remaining letdown water were added under high speed stirring to adjust the viscosity. The mixing was continued for 5-10 min. The final mixture was equilibrated at room temperature for one day before addition of colorant. Colortrend 808 Yellow Oxide colorant was post added at a level of 12 fluid oz/gal (94 mL/L) of base paint.

Water Staining Testing Method:

ASTM D7190 was followed to evaluate resistance towards staining caused by the leaching of water soluble materials. Using a 7-mil drawdown bar, paints were drawn down over Black Leneta Vinyl charts. Each drawdown was divided in three sections to carry out tests at 1 d and 4 d of drying. Coatings were allowed to dry at 77° F. (25° C.) and 50% relative humidity before testing. Water droplets (0.1 g/cm³) were placed across the top of the first designated area of the coating and allowed to stand for 10 min, whereupon charts were lifted to a vertical position to allow water to run down.

Testing for water staining after 1 d and 4 d of drying at the same temperature and relative humidity were carried out. Stains were rated as barely visible to poorly visible—HV refers to highly visible, V refers to visible, and BV refers to barely visible stains.

The results of resistance towards staining caused by the leaching of water soluble materials are shown in Table 2. Comp 1 refers to the paint formulation without any $Zn^{++}$ additive; Ex 1 and Ex 2 refer to paint formulations with ZnO and $Zn(NH_3)_2(CO_3)_2$, respectively. Colorant amounts are in g/100 mL of the base paint.

TABLE 2

Water staining results using Colortrend 808 Yellow Oxide colorant

| Binder | | | | Water Staining Results | |
| --- | --- | --- | --- | --- | --- |
| Example | Zinc Source | Wt % | Colorant | 1 d | 4 d |
| Comp 1 | None | 0 | 17.4 | V | HV |
| Ex 1 | ZnO | 2.5 | 17.4 | BV | BV |
| Ex 2 | $Zn(NH_3)_2(CO_3)_2$ | 1.5 | 17.4 | BV | BV |

The results show that zinc-containing deep base paints had significantly better resistance towards water staining compared to the paints containing no zinc.

The invention claimed is:

1. A paint composition comprising a stable aqueous dispersion of acrylic based polymer particles functionalized with from 0.2 to 12 weight percent, based on the weight of the polymer particles, of structural units of a monomer with keto functionality; a colorant at a concentration in the range of from 5 to 25 weight percent, based on the weight of the paint composition; from 0.5 to 5 weight percent of a $Zn^{++}$ compound, based on the weight of the paint composition; and from 0.5 to 10 weight percent of a dihydrazide or a polyamine, based on the weight of the paint composition; and a substantial absence of extenders;

wherein the polymer particles are two-phase polymer particles with a soft phase having a $T_g$ of not more than 0° C., and a hard phase having a $T_g$ of not less than 30° C.; wherein the ratio of the soft phase to the hard phase is in the range of from 90:10 to 60:40; with the proviso that the polymer particles have an overall $T_g$ of less than 15° C.

2. The paint composition of claim 1 wherein the monomer with keto functionality is acetoacetoxyethyl methacrylate or diacetone acrylamide at a concentration in the range of from 1 to 5 weight percent, based on the weight of the acrylic based polymer particles.

3. The paint composition of claim 2 which comprises a dihydrazide, a diamine, or a polyetheramine.

4. The paint composition of claim 1 wherein the colorant has a concentration in the range or from 8 to 20, based on the weight of the composition, wherein the composition comprises less than 5 PVC from $TiO_2$, $BaSO_4$, silicates, aluminosilicates, $CaCO_3$, nepheline, feldspar, wollastonite, kaolinite, dicalcium phosphate, and diatomaceous earth, and wherein the paint composition comprises a dihydrazide.

5. The paint composition of claim 4 wherein the colorant is phthalocyanine blue, phthalocyanine green, monoarylide yellow, diarylide yellow, benzimidazolone yellow, heterocyclic yellow, DAN orange, quinacridone magenta, quinacridone violet, or an organic red, wherein the composition comprises less than 1 PVC from $TiO_2$, $BaSO_4$, silicates, aluminosilicates, $CaCO_3$, nepheline, feldspar, wollastonite, kaolinite, dicalcium phosphate, and diatomaceous earth.

6. The paint composition of claim 1 wherein the $Zn^{++}$ compound is ZnO or $Zn(NH_3)_2(CO_3)_2$ present at a concentration in the range of from 0.2 to 4 weight percent, based on the weight of the composition.

7. The paint composition of claim 3 wherein the dihydrazide is adipic acid dihydrazide.

8. The composition of claim 1 wherein the polymer particles have a) a first phase that comprises from 45 to 70 weight percent structural units of 2-ethylhexyl acrylate, and from 20 to 50 weight percent structural units of methyl methacrylate or styrene, based on the weight of the first phase of the polymer particles; and b) a second phase that comprises from 85 to 98.5 weight percent methyl methacrylate or styrene based on the weight of the second phase of the polymer particles;

wherein the polymer particles further comprise from 4 to 10 weight percent structural units of acetoacetoxyethyl methacrylate or from 1 to 5 weight percent structural units of diacetone acrylamide, and from 0.5 to 5 weight percent structural units of acrylic acid or methacrylic acid, based on the weight of the polymer particles.

9. The composition of claim 1 wherein the polymer particles have a) a first phase that comprises from 10 to 60 weight percent structural units of butyl acrylate, from 15 to 65 weight percent structural units of 2-ethylhexyl acrylate, and from 10 to 50 weight percent structural units of methyl methacrylate or styrene, based on the weight of the first phase of the polymer particles; and b) a second phase that comprises from 85 to 98.5 weight percent methyl methacrylate or styrene;

wherein the polymer particles further comprise from 4 to 10 weight percent structural units of acetoacetoxyethyl methacrylate or from 1 to 5 weight percent structural units of diacetone acrylamide, and from 0.5 to 5 weight percent structural units of acrylic acid or methacrylic acid, based on the weight of the polymer particles.

10. The paint composition of claim 1 which further includes a rheology modifier, a defoamer, a neutralizing agent, a surfactant, and a dispersant.

* * * * *